United States Patent [19]

Pierce

[11] 4,296,851
[45] Oct. 27, 1981

[54] DRIVE HUB WITH CURVED SPRINGS AND DRIVE KEYS FOR ELECTRO-MAGNETIC CLUTCH

[75] Inventor: William C. Pierce, Dallas, Tex.
[73] Assignee: Pitts Industries, Inc., Dallas, Tex.
[21] Appl. No.: 44,775
[22] Filed: Jun. 1, 1979
[51] Int. Cl.³ .................... F16D 3/00; F16D 27/10
[52] U.S. Cl. ..................... 192/84 C; 192/89 B; 192/106.1
[58] Field of Search ............ 192/84 C, 106.1, 89 B; 64/27 R, DIG. 2, 27 L

[56] References Cited

U.S. PATENT DOCUMENTS

| | | | |
|---|---|---|---|
| 2,068,963 | 1/1937 | Spase | 192/106.1 |
| 2,080,455 | 5/1937 | Bechtel | 64/27 R |
| 2,114,247 | 4/1938 | Davis | 192/106.1 |
| 2,141,014 | 12/1938 | Nutt | 192/106.1 |
| 2,407,757 | 9/1946 | MacCallum | 192/84 C |
| 3,246,485 | 4/1966 | Chapman | 64/27 R |
| 3,368,657 | 2/1968 | Wrensch et al. | 192/84 C |
| 3,428,155 | 2/1969 | Binder et al. | 192/106.1 |
| 3,565,223 | 2/1971 | Pierce | 192/84 C |
| 3,582,697 | 6/1971 | Bochan | 192/84 C X |
| 3,620,339 | 11/1971 | Becking | 192/84 C X |
| 4,243,128 | 1/1981 | Shirai | 192/84 C X |

FOREIGN PATENT DOCUMENTS 692933 11/1930 France .................. 64/27 R

Primary Examiner—Rodney H. Bonck
Attorney, Agent, or Firm—Harvey B. Jacobson

[57] ABSTRACT

An electromagnetic clutch for transmitting driving torque from one rotatable element to another having particular utility for driving a vane-type compressor used in an automotive air conditioning system in a manner to reduce the cost of such clutches as well as the axial length and weight. The clutch includes a rotatably driven pulley assembly connected to a hub affixed to the input drive shaft of the compressor through an armature disk and friction face on the pulley assembly by selectively energizing and deenergizing a magnetic coil with the armature disk being connected to the hub through a plurality of curved leaf springs and a plurality of drive keys received in recesses or notches with the curved springs replacing the normal flat springs which are used to support the armature disk with the curved springs including a linear flexibility and axial flexibility. The flexibility permits the compressor shaft to yield thereby avoiding binding of the compressor rotor and also provides a significantly shorter clutch assembly by eliminating a rubber "sandwich" hub assembly which is especially important in smaller automobiles and reduces the weight of the clutch by a significant amount. With the drive keys and recesses or notches, there is no restriction to radial or axial deflection, but the drive keys and recesses limits the linear deflection of the springs so that they will not deflect beyond a predetermined point which would cause them to take a permanent set during initial clutch engagement when the clutch torque is extremely high.

3 Claims, 6 Drawing Figures

U.S. Patent  Oct. 27, 1981  Sheet 1 of 2  4,296,851
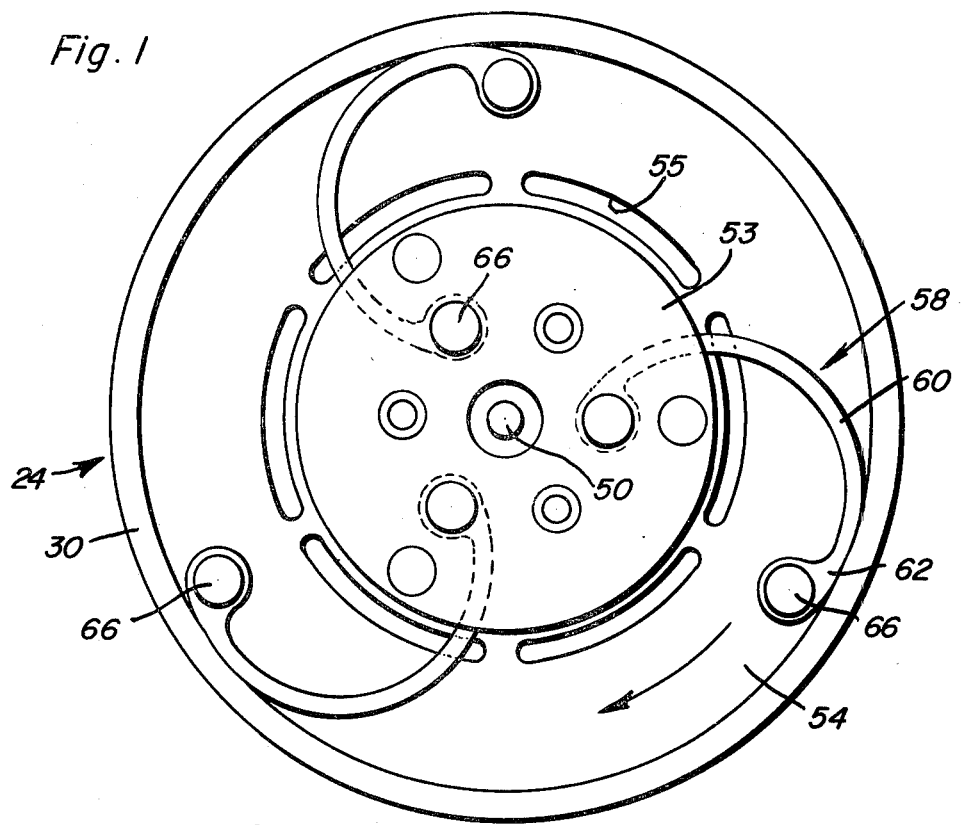
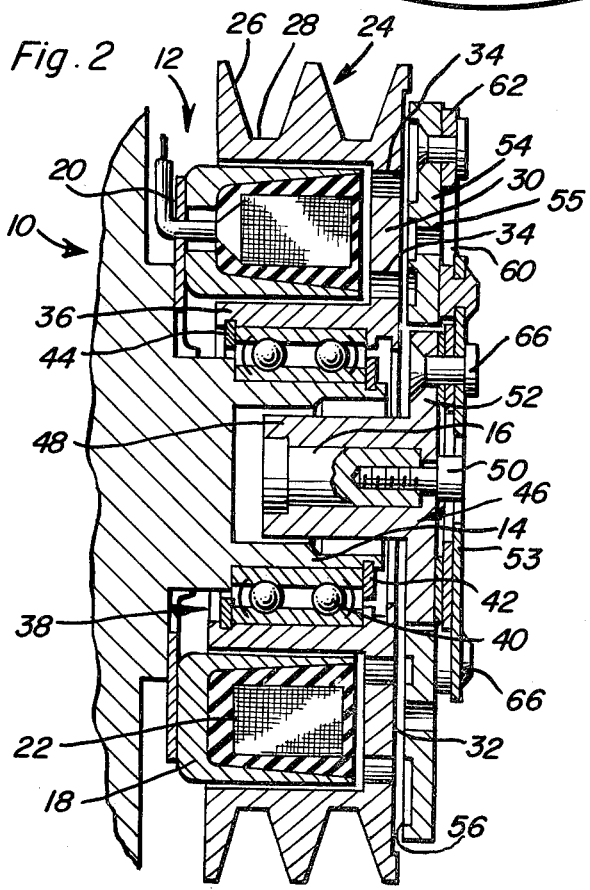

DRIVE HUB WITH CURVED SPRINGS AND DRIVE KEYS FOR ELECTRO-MAGNETIC CLUTCH

BACKGROUND OF THE INVENTION

1. Field of the Invention

The present invention generally relates to an electromagnetic clutch and more particularly a clutch using curved flat leaf springs to transmit torque and permit axial flexibility of the axially movable component of the clutch, together with a key and notch drive connection to enable limited relative rotational movement between the inner and outer ends of the springs thereby assuring that the springs will not be deflected beyond their elastic limit during high torque startup of the compressor of an air conditioning unit in an automobile.

2. Description of the Prior Art

In the development of electromagnetic clutches for driving air conditioning compressors in an automobile, my prior U.S. Pat. No. 3,565,223 issued Feb. 23, 1971, discloses one structure which has been known for a number of years in which flat leaf springs are used to transmit torque and a resilient insert is incorporated into the hub to provide flexibility or resiliency in the drive connection to the input shaft of the compressor. Prior U.S. Pat. No. 3,205,989, issued Sept. 14, 1965, discloses another type of electromagnetic clutch using similar straight flat leaf springs and a resilient coupling in the drive train. While such devices have operated satisfactorily, it is noted that the resilient insert arrangements utilizing rubber or some other resilient plastic material materially increases the over-all length and other dimensional characteristics of the clutch and, of course, increases the weight of the clutch as well as the cost thereof, all of which are desired to be maintained at a minimum. In both of the prior art patents mentioned above and in other similar devices on the market, a pulley is driven from a belt connecting with the crank shaft or other rotatable component of an internal combustion engine and drives the input shaft of a compressor through a magnetic clutch and a resilient coupling. Basically, the magnetic clutch includes an axially movable armature disk connected to the hub of the clutch through flat leaf springs which enables axial movement of the armature disk and transmits torque to the hub which is connected to the input shaft. The armature disk is attracted to a friction face on the rotatable pulley through an energizable magnetic coil. Also, a resilient insert is interposed in the drive coupling between the pulley and input shaft of the compressor to prevent binding of the compressor shaft or rotor. The previously patented and existing electromagnetic clutches are somewhat bulky, include many components, are relatively heavy and have a substantial over-all length.

SUMMARY OF THE INVENTION

An object of the present invention is to provide an electromagnetic clutch incorporating curved flat leaf springs interconnecting the armature disk and hub in an electromagnetic clutch to provide for radial, circumferential and axial flexibility and to replace the presently used straight flat leaf springs and a rubber "sandwich" type flexible hub in which the curved springs serve the dual function of the presently used flat leaf springs and the "sandwich" type flexible and resilient rubber hub.

Another object of the invention is to provide an electromagnetic clutch in accordance with the preceding object in which the hub includes a mechanical driving connection incorporating radially disposed keys or lugs received in correspondingly shaped radially disposed recesses or notches having a larger circumferential dimension than the keys or lugs to enable limited relative rotation between two components of the hub, thereby limiting the deflection of the curved springs during high torque transmission periods to prevent the springs from being deflected or bent beyond their elastic limit, thereby preventing such springs from taking a permanent set due to being deflected beyond their elastic limit.

Still another object of the invention is to provide an electromagnetic clutch in accordance with the preceding objects in which the curved springs and drive keys and recesses which provides for radial, circumferential and axial flexibility which enables driving engagement and release of the armature disk of the clutch and limits the deflection or linear elongation of the springs to eliminate permanently setting the springs also provides for a fewer number of parts, a significantly shorter clutch assembly and a weight reduction of the assembly all of which are of significant benefit when installing the electromagnetic clutch in an automobile to drive the compressor of the air conditioning system from a belt or belts driven from the crank shaft or other pulley of an internal combustion engine, or the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front end elevational view of the electromagnetic clutch of the present invention illustrating the curved springs interconnecting the drive disk and hub.

FIG. 2 is a vertical sectional view of the clutch illustrating the relationship of the components of the present invention.

FIG. 6 is a perspective view of one of the curved springs.

DESCRIPTION OF THE PREFERRED EMBODIMENT

Figure 3:
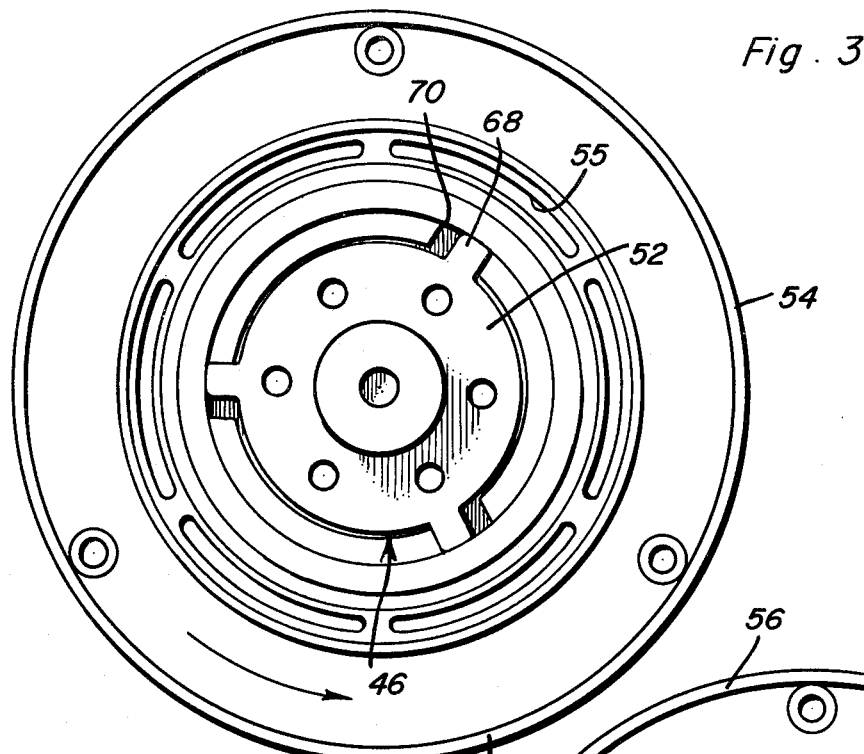
FIG. 3 is an elevational view of the inner end of the hub and armature disk with the springs removed to illustrate the relative position thereof when transmitting high torque to the hub and input shaft of the compressor.

Referring now specifically to the drawings, a compressor 10 is illustrated somewhat schematically in FIG. 2 which may be a vane-type compressor utilized in an automobile air conditioning system with the electromagnetic clutch 12 of the present invention being associated therewith in a manner similar to that disclosed in my prior U.S. Pat. No. 3,565,223 which disclosure is incorporated herein by reference thereto with FIG. 2 of the drawings in this application being comparable to FIG. 1 of the drawings in U.S. Pat. No. 3,565,223.

The compressor 10 includes a stationary and rigid collar or sleeve 14 projecting from the compressor housing and a compressor drive shaft or input shaft 16 is disposed centrally in the collar 14 with rotation of the shaft 16 causing rotation of the rotor of the vane-type compressor in a conventional and well-known manner.

A stationary coil shell 18 is supported fixedly from a shoulder on the compressor 10 by suitable brackets 20 and a magnetic coil 22 is positioned within the interior of the coil shell 18 in a manner well-known in the art.

Rotatably journaled from the projecting collar 14 is a pulley 24 having one or more pulley grooves 26 formed in the outer rim 28 thereof. The pulley 24 also includes a clutch plate 30 having an axial friction face 32 and arcuate slots 34 therein in a conventional manner. The inner edge of the plate 30 is provided with a sleeve or rim 36 concentric with the collar 14 and journaled therefrom by a bearing assembly 38 in the form of a double ball bearing arrangement 40 held in place by snap rings 42 and 44 in a conventional and well-known manner so that the pulley 24 is rotatably supported from the stationary collar 14 while the coil shell and magnetic coil are fixedly supported from the compressor 10 by the brackets 20, all of which represents conventional electromagnetic clutch structure.

Attached to the compressor input drive shaft 16 is a hub 46 having a sleeve 48 telescoped over the shaft 16 and keyed thereto in a conventional manner and retained in position thereon by an axial bolt 50. The hub 46 includes a hub plate 52 rigid therewith and extending radially outwardly generally a distance to cover the inner edge of the annular plate 30 of the pulley 24. Concentrically arranged with respect to the hub plate 52 is an annular armature disk or plate 54 which includes an inner face 56 in opposed relation to the face 32 on the pulley plate 30 with energization and deenergization of the magnetic coil 22 serving to engage the clutch faces 32 and 56 or permit disengagement thereof. When the clutch faces are engaged, rotational movement of the pulley 24 will be transmitted to the armature disk 54.

Interconnecting the hub plate 52 and the armature disk 54 is a plurality of arcuate flat leaf springs 58 each of which are generally U-shaped in configuration and includes an elongated arcuate central portion 60 and inwardly offset end ears or lugs 62 which have apertures 64 therein for receiving anchoring rivets 66 with the outer end of each spring 58 being riveted to the armature disk 54 adjacent the outer circumference thereof and the inner end being connected to the hub plate 52 for transmitting drive torque therebetween with the central portion 60 of the spring 58 being deflected from its normal curved condition during transmission of torque to provide a resilient drive coupling between the armature disk 54 and the compressor input shaft 16. The flat leaf spring structure also provides axial flexibility for movement of the armature disk toward and away from the face 32 of the pulley plate 30 so that the springs 58 are used to replace both the straight leaf springs and the rubber "sandwich" hub employed in the aforementioned prior U.S. Pat. No. 3,565,223 with the springs 58 serving the dual purpose of the straight springs and the "sandwich" hub. The number of springs 58 may vary depending upon the installational load requirements. The curved springs replace the flat springs as disclosed in the aforementioned patent and support the armature disk and the desired axial tension is attained by increasing the pretension slightly on the springs to provide the same axial tension as the replaced flat springs. The curvature of the springs and the narrow width thereof combine to provide a linear flexibility and resiliency to the springs when a torque force is applied between the holes to which the ends of the springs are riveted. The depth of the curve provides the same radial and axial flexibility when assembled as provided by the replaced rubber "sandwich" type flexible hub or coupling and this flexibility is needed to permit the compressor shaft to yield thereby avoiding the compressor rotor from binding which occurs without a flexible or resilient drive coupling. The curved springs also provide an advantage by permitting a significantly shorter clutch assembly by elimination of the rubber "sandwich" hub assembly which is especially important in smaller automobiles and also provides an advantage by reducing the weight of the electromagnetic clutch by elimination of a rubber "sandwich" hub assembly.

As illustrated, the rivet hole centers are angularly offset which permits the springs to be in tension when the clutch is engaged and driving. This angular component prohibits any backlash due to torsional pumping vibrations. Thus even if the rivets were slightly loose, they would not turn and work loose, whereas if the rivet holes were lined up radially, this could occur.

Figure 4:
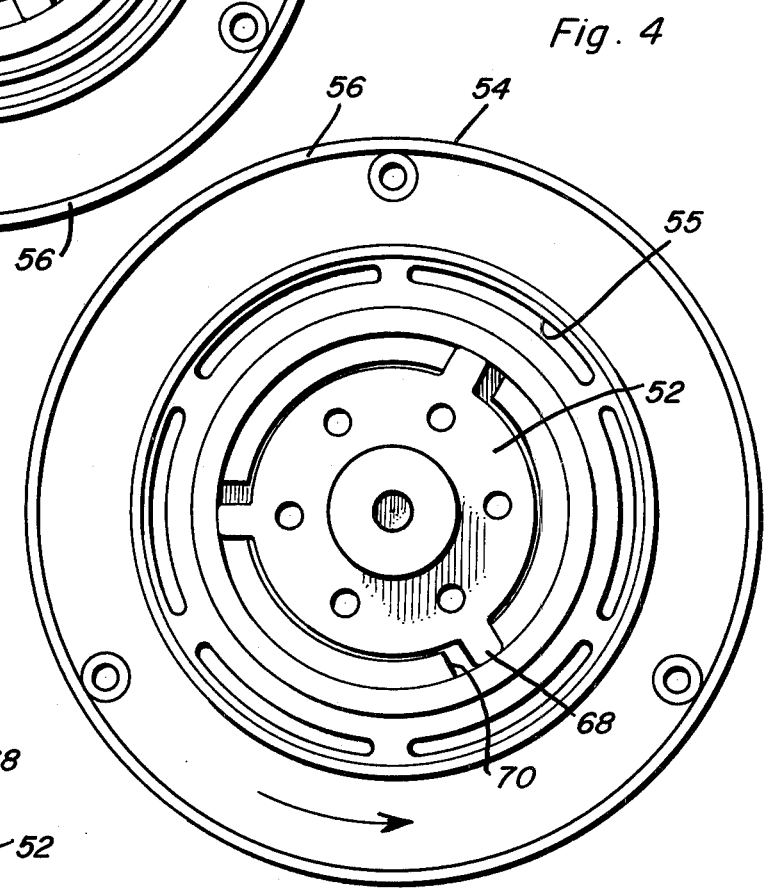
FIG. 4 is an end elevational view similar to FIG. 3, but illustrating the other extreme position of the armature disk and hub when low torque is being transmitted.
Figure 5:
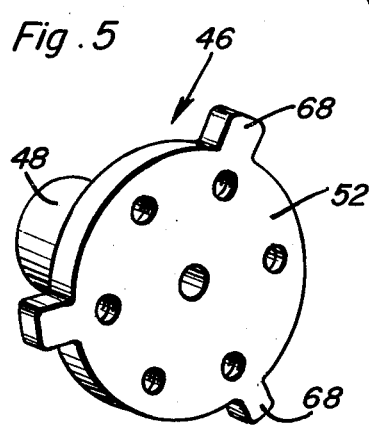
FIG. 5 is a perspective view of the hub.

FIGS. 3–5 illustrate an arrangement in which the deflection of the springs 58 is limited by the provision of radially extending keys or lugs 68 on the hub plate 52 which are received in corresponding recesses or notches 70 in the inner edge of the armature disk 54. When observing the armature disk 54 from the inner surface as in FIG. 3, the keys or lugs 68 will be engaged by and positively driven by the trailing surfaces of the recesses or notches 70 thereby limiting the deflection or linear straightening of the springs 58, thereby preventing them from being bent or deflected beyond their elastic limit thereby preventing the springs 58 from taking a permanent set. While three drive keys 68 have been shown, more than three can be used if desired. In some installations, up to six drive keys have been used successfully. When clutch torque is at a maximum value, such as when the clutch is engaged at high speeds, the inertia reaction exerts substantial forces on the springs. Such forces, in some instances, tend to deflect the springs beyond their designed elastic limit and thus cause the springs to take a permanent set. Thus, by adding the drive keys, more flexibility in design is permitted in the springs in order to maintain them at a desired thickness and desired metallurgical composition without restricting the radial, circumferential or axial deflection, yet eliminating any problem of the spring bending during the initial engagement when the clutch torque may read as high as 80 ft. lbs., whereas the driving load of the compressor after initial startup is approximately one-third of the startup torque.

The armature disk 54 is provided with the usual arcuate slots 55 therein and the hub plate 52 is provided with the usual cover plate 53 secured in position by suitable fasteners and which covers the plate 52 and a portion of the armature disk 54 in a conventional manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a magnetic clutch for driving a shaft including a rotatable element having a friction face positioned around and independent of the shaft, an armature disk positioned around the shaft and including a friction face in opposed relation to the friction face on the rotatable element, an electromagnet for selectively moving the friction faces into driving engagement, that improvement comprising a flexible drive coupling between the armature disk and drive shaft, said coupling comprising a plurality of arcuately curved leaf springs, each spring having one end connected with the armature disk, means drivingly connecting the other end of each spring with the shaft to enable flexibly resilient axial, radial and circumferential relative movement between the armature disk and drive shaft, said means drivingly connecting the springs and drive shaft comprising a hub affixed to the drive shaft and including a hub plate, the armature disk being positioned around the hub plate with the inner ends of the arcuately curved springs being connected to the hub plate, each of the springs being generally U-shaped and including an elongated central arcuate portion and radially inwardly offset ends anchored to said hub plate and armature disk, respectively, the end of each spring attached to the armature disk lying along a radius of the hub plate and armature disk and the end of the spring attached to the hub plate being disposed adjacent to but in slightly trailing relation to the same radius when the springs are not deflected, the central portion of each spring including a concave edge opening in the direction of rotation with transmission of torque between the armature disk and hub plate being transmitted through the springs with the degree of deflective elongation of the springs being determined by the torque transmitted thereby causing the central portions of the springs to straighten to increase the distance between the ends.

2. The structure as defined in claim 1 together with means positively drivingly connecting the armature disk and hub plate which includes a plurality of radially disposed lugs on the outer periphery of the hub plate and notches on the inner periphery of the armature disk with the notches having a circumferential dimension greater than the circumferential dimension of the lugs to enable relative rotational movement between the armature disk and hub plate equal to the difference in circumferential dimension between the lugs and notches whereby high torque transmission between the armature disk and hub plate through the springs will deflect the springs within the limits of relative rotational movement between the armature disk and hub plate permitted by the difference in circumferential dimension between the notches and lugs.

3. The structure as defined in claim 2 wherein said drive shaft is the input shaft of an automobile air conditioner compressor and said rotatable element includes pulley groove means on the exterior thereof for receiving driving torque from a drive belt powered by an internal combustion engine in an automobile in which the startup torque of the compressor is greater than the running torque of the compressor whereby the driving engagement between the trailing edges of the notches and lugs provides positive driving connection to transmit high torque after initial limited deflection of the springs and the resiliency of the springs is sufficient to transmit relatively low torque during normal rotation of the compressor drive shaft after initial startup.

* * * * *